United States Patent
Fukui et al.

(10) Patent No.: US 6,659,136 B2
(45) Date of Patent: Dec. 9, 2003

(54) FLEXIBLE HOSE

(75) Inventors: Kouki Fukui, Takatsuki (JP); Hiroyuki Masui, Takatsuki (JP); Toshihiro Nakanishi, Takatsuki (JP); Isao Kurimoto, Takatsuki (JP); Masahiko Ogake, Takatsuki (JP)

(73) Assignee: Totaku Industries, Inc., Osaka (JP)

( * ) Notice: Subject to any disclaimer, the term of this patent is extended or adjusted under 35 U.S.C. 154(b) by 220 days.

(21) Appl. No.: 09/789,800

(22) Filed: Feb. 22, 2001

(65) Prior Publication Data
US 2001/0017164 A1 Aug. 30, 2001

(30) Foreign Application Priority Data

| Feb. 25, 2000 | (JP) | 2000-050342 |
| Mar. 30, 2000 | (JP) | 2000-093131 |
| Jun. 15, 2000 | (JP) | 2000-180250 |
| Jun. 16, 2000 | (JP) | 2000-181841 |

(51) Int. Cl.[7] ............................................. F16L 11/00
(52) U.S. Cl. ........................ 138/125; 138/129; 138/137; 138/150; 428/36.91
(58) Field of Search ................................. 138/125, 129, 138/137, 150, 109, 104, 114; 428/36.91

(56) References Cited

U.S. PATENT DOCUMENTS

| 3,073,353 | A | * | 1/1963 | Rittenhouse | 138/148 |
| 3,478,770 | A | * | 11/1969 | Osborn et al. | 138/135 |
| 3,706,326 | A | * | 12/1972 | Bringolf | 138/129 |
| 3,739,815 | A | * | 6/1973 | Rejeski | 138/122 |
| 3,846,202 | A | * | 11/1974 | Clarke | 138/129 |
| 3,889,716 | A | * | 6/1975 | Linhart | 138/129 |
| 4,098,298 | A | * | 7/1978 | Vohrer | 138/122 |
| 4,204,562 | A | * | 5/1980 | Kelly | 138/132 |
| 4,929,478 | A | * | 5/1990 | Conaghan et al. | 428/36.1 |
| 5,526,849 | A | * | 6/1996 | Gray | 138/133 |
| 5,954,096 | A | * | 9/1999 | Lepoutre | 138/129 |
| 5,975,144 | A | * | 11/1999 | Akedo et al. | 138/129 |
| 6,308,741 | B1 | * | 10/2001 | Payne | 138/110 |
| 6,347,646 | B2 | * | 2/2002 | Fukui et al. | 138/129 |

FOREIGN PATENT DOCUMENTS

| JP | 39-36553 | 12/1964 |
| JP | 07-100926 | 1/1995 |
| JP | 09-135795 | 5/1997 |
| JP | 09-285426 | 11/1997 |
| JP | 11-178760 | 7/1999 |
| JP | 11-187999 | 7/1999 |
| JP | 2000-262435 | 9/2000 |
| JP | 2000-262445 | 9/2000 |
| JP | 2001-161612 | 6/2001 |
| JP | 2001-204664 | 7/2001 |

* cited by examiner

Primary Examiner—James Hook
(74) Attorney, Agent, or Firm—Wenderoth, Lind & Ponack, L.L.P.

(57) ABSTRACT

A flexible hose having air-permeability is formed by either: sandwiching an air-permeable tape between tape end edge portions, as leading and trailing in a hose longitudinal direction, of a soft resin tape that is helically wound integrally with the air-permeable tape; or by helically winding only an air-permeable tape. The flexible hose can be properly used as a cleaner hose of a discharge circulation type by using it as an outer tube of a double tube structure. By providing lubricating properties to an inner circumference of the outer tube or an outer circumference of the inner tube, it is possible to prevent wear which might otherwise be caused by rubbing contact between the inner tube and outer tube.

14 Claims, 11 Drawing Sheets

FLEXIBLE HOSE

BACKGROUND OF THE INVENTION

1. Field of the Invention

The present invention relates to a flexible hose which has proper flexibility and strength despite an air-permeable structure and, more particularly, to a flexible hose which can be suitably used in a vacuum cleaner as a suction hose for connecting a suction nozzle to a cleaner body.

2. Related Art

In a flexible hose to be used as a sucking/discharging or blowing duct, a portion of air to pass through the hose may have to be discharged to an exterior of the hose from a midway portion of the hose, or may have to be sucked in from the exterior of the hose from this midway portion. For example, when an electric conductor is inserted into the hose, heat generation of the electric conductor can be suppressed by introducing cooling air into the hose. At this time, cooling efficiency can be further improved by introducing fresh air through individual portions of the hose, in a hose longitudinal direction, from exterior of the hose.

Alternatively, an entrance of a hose can be disposed to face hot air exiting from a warming fan heater to introduce the hot air into the hose and to blow the hot air from a midway air-permeable portion. Accordingly, it is conceivable to utilize this hose for drying wash, or to utilize the hose as a steamer by disposing a wet cloth at the air-permeable portion.

However, such a flexible hose is provided with an air port such that it is defective in that strength of the hose is reduced, and a shape keeping property of the hose is also reduced.

With regard to a home vacuum cleaner, generally, a cleaner body having a suction motor and a filter therein is connected with a suction nozzle, having a suction port, through a flexible cleaner hose so that dust sucked from the suction port of the nozzle is fed from the cleaner hose to, and collected in, the cleaner body while air having passed through the filter in the cleaner body is discharged from an exit port in the cleaner body to an exterior of the cleaner body.

When air is thus discharged from the cleaner body, however, recognized have been disadvantages in that dust is blown upwardly, by discharge pressure, from a floor, and that air exiting the exit port has an unpleasant odor.

In order to solve these problems, there has been developed in recent years a cleaner hose having a double tube structure. In this structure, air having passed through the filter is not discharged as it is to exterior of the cleaner body, but is rather circulated from one passage of the cleaner hose to the nozzle, and having left the nozzle is sucked again as sucking air from the suction port, so that a kind of circulation circuit is constructed.

If the sucked air is not completely discharged, but rather wholly suppliedd to the nozzle, load on a suction motor is so seriously increased by passage resistance up to the nozzle that calorific power is increased. If capacity of the suction motor is enlarged to counteract this, the vacuum cleaner is defective because of its enlarged size and increased costs related to the enlarged suction motor.

If the cleaner hose includes an inner tube and an outer tube, clearance between the inner tube and the outer tube is not so large that these tubes are prevented from rubbing against each other when the hose is bent. As this rubbing is repeated, the hose may be worn and thinned so much as to be broken. Specifically, if in one of the inner tube and the outer tube there are sheathed conductors for connecting the vacuum cleaner body to a switch or the like on the nozzle side, these conductors may be exposed as the aforementioned wear proceeds.

SUMMARY OF THE INVENTION

Therefore, a first object of the invention is to provide a flexible hose which has a sufficient strength while retaining air-permeability.

Another object of the invention is to provide a flexible hose, which is formed by helically winding both a resin tape and an air-permeable tape, so that a desired length of the hose from short to very long can be arbitrarily provided.

Still another object of the invention is to provide an optimum hose in which a resin tape of a soft resin is reinforced by a reinforcing core, or cores, so that the hose is provided with additional and proper flexibility and strength, and is optimized so as to be capable of being repeatedly bent.

A further object of the invention is to provide a flexible hose which is formed by helically winding an air-permeable tape, reinforced by a reinforcing core or cores, so that the hose is provided with a strength and a proper flexibility throughout its entirety while retaining a sufficient air-permeability over its entirety.

A further object of the invention is to provide a cleaner hose for releasing a portion of hot air to be circulated to a nozzle, which cleaner hose has suitable flexibility and strength while retaining an air-permeability.

A further object of the invention is to provide a hose which is formed by helically winding soft resin tape integrally with an air-permeable tape sandwiched between end edge portions of the soft resin tape in a hose longitudinal direction so that hose strength and proper flexibility are provided throughout the hose in its entirety via a shape keeping property and flexibility of the soft resin tape, while air-permeability of the hose is retained, such that the hose is optimized as an outer tube of a cleaner hose having a double-tube structure.

A further object of the invention is to provide a flexible hose for a cleaner, which hose can release a portion of hot air circulating toward a nozzle through an air-permeable portion of an outer tube of the hose, so that the hose can prevent a motor of the cleaner body from being overheated, to thereby improve durability of the motor.

A further object of the invention is to provide a flexible hose to be used as a cleaner hose, which hose can easily be enabled to have an arbitrary draft by changing a ratio of widths of an air-permeable tape and a resin tape which are to be helically wound on each other.

A further object of the invention is to provide a flexible hose to be used as a cleaner hose, in which an air-permeable tape is a two-layered structure of a woven fabric and a non-woven fabric so that weaving members of the woven fabric, especially in a hose longitudinal direction, resists tension in the longitudinal direction when the hose is bent, while dust in the hose is prevented by the non-woven fabric from being discharged together with a heated discharge, whereby a strong hose can be obtained.

A further object of the invention is to continue an air-permeable effect for a long time by winding a woven fabric on an outer side of a hose while preventing air-permeable holes of the woven fabric, via a filter effect of the non-woven fabric, from being clogged by dust.

A further object of the invention is to provide a flexible hose for a cleaner, in which an air-permeable tape and a resin tape are fused with a reinforcing resin core, or cores, of the resin tape so that a highly strong fusion is obtained via high heat capacity of the reinforcing core, or cores, to reduce separation at fused portions.

A further object of the invention is to provide a double-tube structure having an inner tube and an outer tube, which can reduce wear of a cleaner hose, as might otherwise occur due to rubbing between the inner tube and the outer tube when frequently bent, by providing lubricating properties, via a lubricant, to at least one of an outer circumference of the inner tube and an inner circumference of the outer tube that may possibly rub against each other.

The objects and features of the invention other than the aforementioned ones will become more apparent from the following embodiments to be described with reference to the accompanying drawings.

DETAILED DESCRIPTION OF THE PREFERRED EMBODIMENTS

Figure 1:
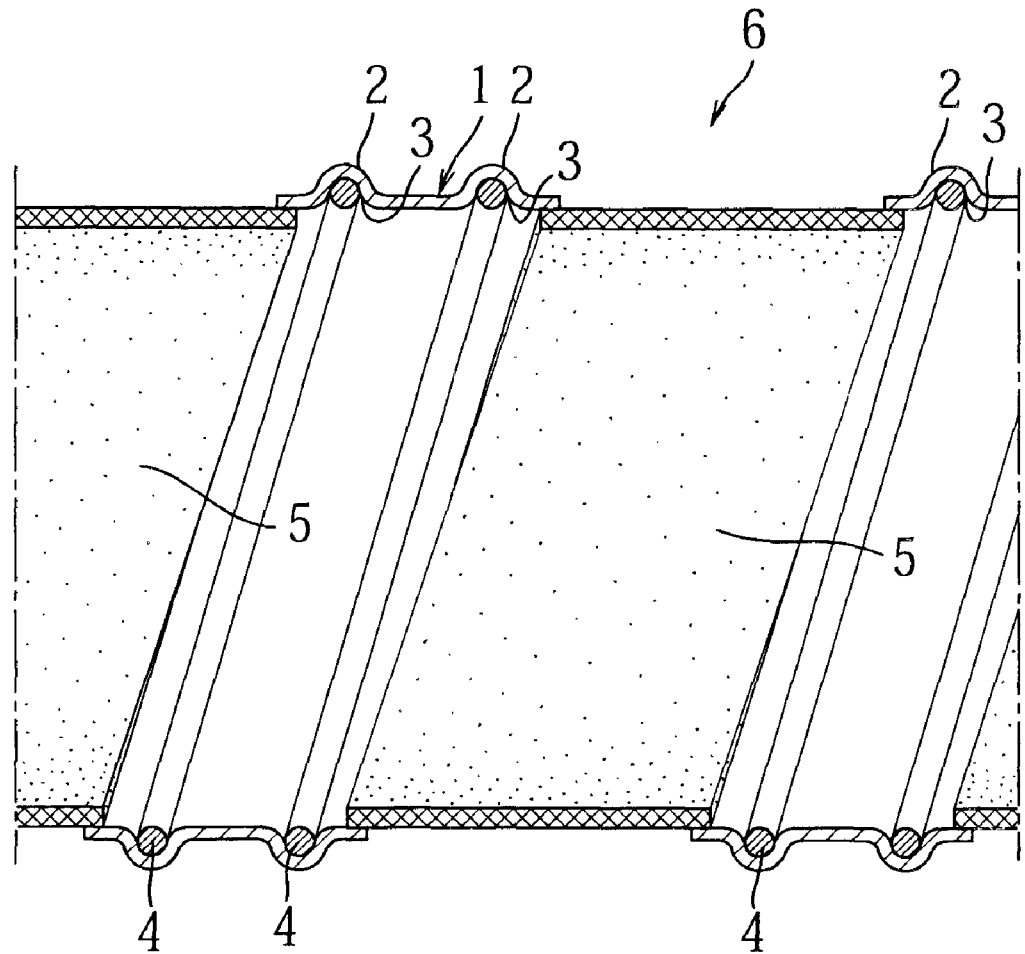
FIG. 1 is a sectional view of a flexible hose of a first embodiment of the invention.
Figure 2:
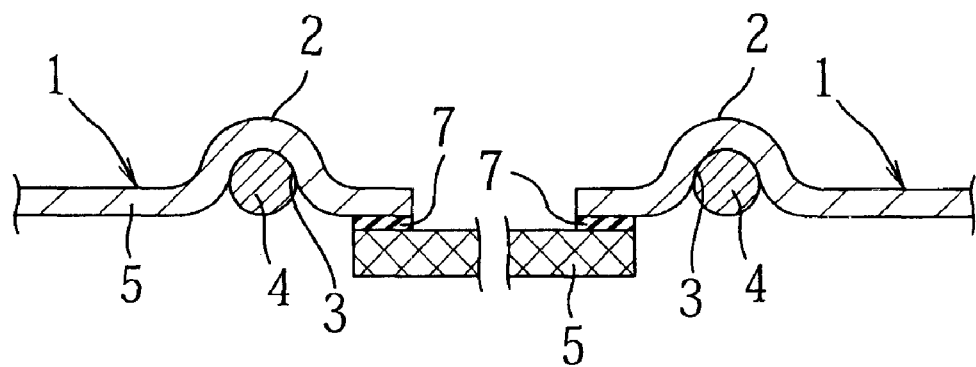
FIG. 2 is an enlarged sectional view of an essential portion of FIG. 1.
Figure 3:
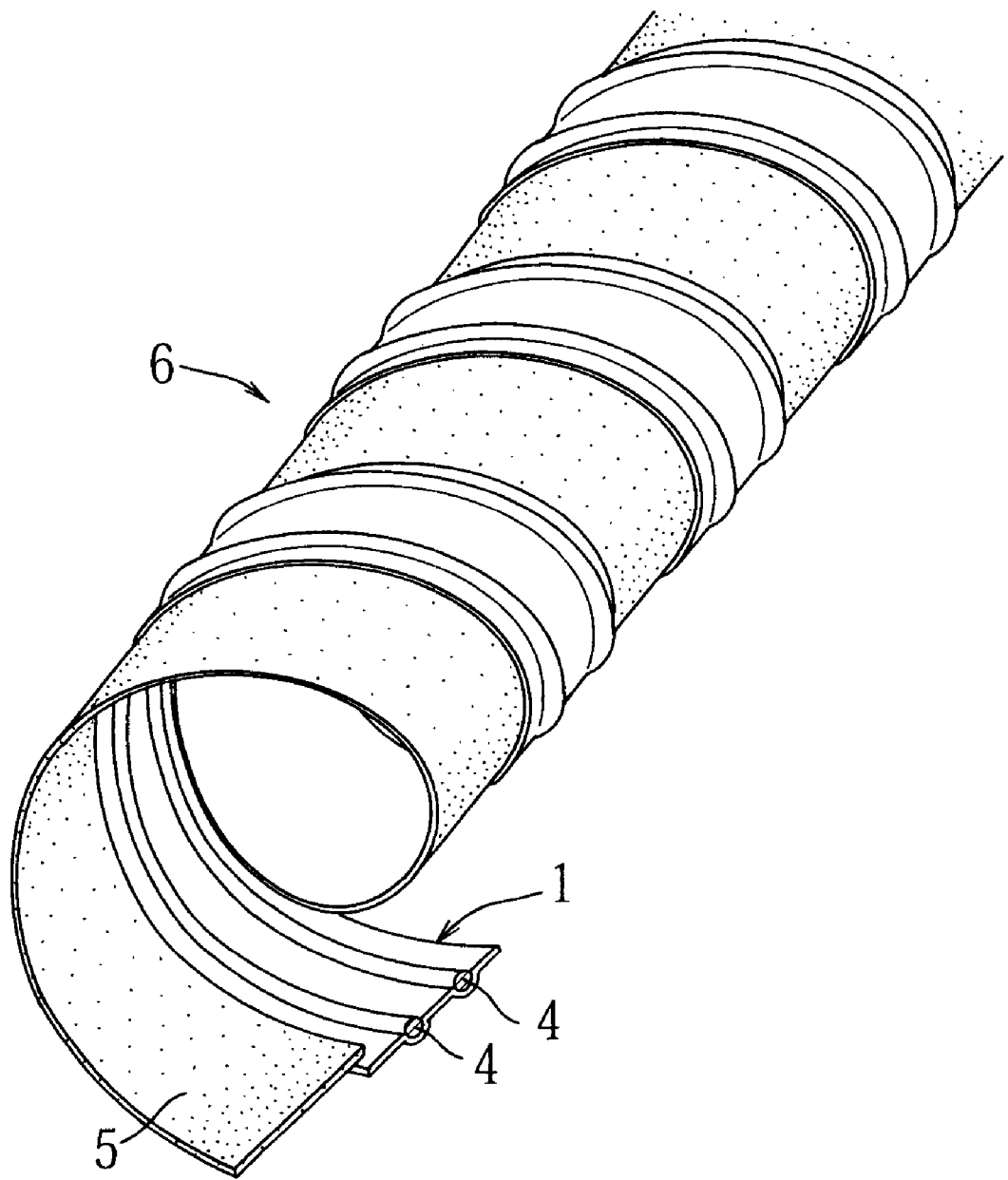
FIG. 3 is a perspective view showing a method of winding the flexible hose of the first embodiment of the invention.

In FIGS. 1, 2 and 3, reference numeral 1 designates a soft resin tape of the invention, as made of a non-vinyl chloride resin such as a polyolefin resin or polystyrene resin, or a vinyl chloride resin.

This resin tape 1 is semi-circularly bulged at two widthwise spaced positions to form two ridges 2 and 2, in a tape longitudinal direction on an outer side portion for a hose outer circumference, and two grooves 3 and 3 also in the tape longitudinal direction in an inner side portion for a hose inner circumference.

In these grooves 3 and 3, individually, there are buried and fixed linear reinforcing cores 4 and 4 to give the tape 1 proper flexibility and strength. These reinforcing cores 4 and 4 are made of a hard resin such as polypropylene or a metal wire.

Numeral 5 designates an air-permeable tape of the invention. This air-permeable tape 5 is made of non-woven or woven fabric, but may be made of another material if this material has air-permeability and proper flexibility.

Moreover, the resin tape 1 and the air-permeable tape 5 are helically wound to form a hose 6. At this time, a spacing is prepared between tape edge portions, as leading and trailing in the hose longitudinal direction, of the resin tape 1 to be helically wound, and the air-permeable tape 5 is helically wound together with the resin tape 1 while filling this spacing. As a result, there is formed the flexible hose 6 which has air-permeable portions partially in the hose longitudinal direction.

In this embodiment of FIGS. 1 and 2, as especially indicated in FIG. 2, one end edge of the air-permeable tape 5 is laid over an inner side of one end edge of the resin tape 1, and another end edge, as confronting the former end edge, of the air-permeable tape 5 is laid over an inner side of another end edge of the resin tape 1. These portions of the resin tape 1 and the air-permeable tape 5 thus overlaid are integrated with each other either by adhering them with an adhesive layer 7 or by fusing them. At this time, the air-permeable tape 5 may be adhered or fused at its end edge portions to outer sides of the resin tape 1.

The flexible hose 6 thus constructed has such an airpermeability as to suck/discharge much air or another gas, or liquid, through the air-permeable tape 5 at a flow velocity unlimitedly approaching zero. In view of the flexible hose 6 in its entirety, the resin tape 1 having a high strength has a shape keeping property such that the resin tape can exhibit an excellent shape keeping property and strength, even when the flexible hose is used in repeatedly bent applications.

This flexible hose 6 can be used as a fermentation bath air feed hose to be used in a fermentation bath such as a dust disposer, a compost or a pickle bath. In this use, the flexible hose 6 can feed fresh air homogeneously to suppress multiplication of anaerobic bacteria, thereby to prevent putrefaction and reduce frequency of agitations.

When the flexible hose 6 is used as a fish preserve oxygen feed hose to be used in a fish preserve, especially in a marine fish preserve, on the other hand, the flexible hose can feed the air (or oxygen) easily over a wide range by virtue of a pump to thereby prevent massive death of bred fish, which might otherwise be caused due to shortage of dissolved oxygen by red tide or green seaweeds (as called "AOKO" in Japanese) especially during summer months.

Figure 4:
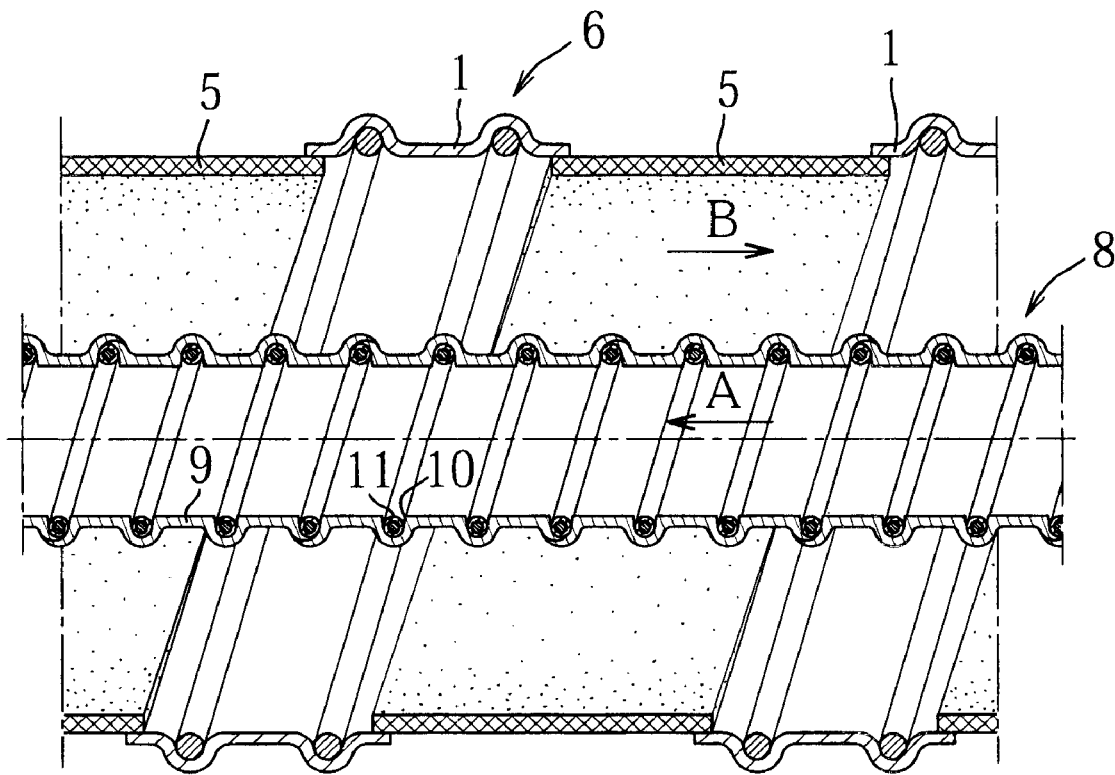
FIG. 4 is a sectional view showing one example of use of the flexible hose of the first embodiment of the invention.

FIG. 4 shows one specific example for using the flexible hose 6. This flexible hose 6 is used as an outer tube of a double-tube structure so that a gas or liquid, to flow in an inner tube 8, may be cooled by air between the inner tube 8 and the outer tube or flexible hose 6.

In the inner tube 8, for example, gas or liquid flows leftwardly, as indicated by arrow A in FIG. 4. The gas or liquid in the inner tube 8 can be cooled by forcing cooling air to flow rightwardly, as indicated by arrow B in FIG. 4, in space between the flexible hose 6 and the inner tube 8. At this time, cooling efficiency can be enhanced by introducing fresh air at a proper rate from air-permeable tape 5 of the flexible hose 6. Another method of use may be exemplified by returning gas having been fed through the inner tube 8 at one end thereof to circulate returned gas into the outer tube or flexible hose 6, while allowing gas either partially or in its entirety to leave the air-permeable tape 5.

In FIG. 4, the inner tube 8 is also made from a flexible hose by helically winding a soft resin tape 9, similar to the resin tape 1, and by adhering or fusing confronting end edge portions of the tape leading and trailing in a longitudinal direction. The tape 9 forming the inner tube 8 is also semi-circularly bulged at a plurality of widthwise positions to form grooves 10 in its inner circumference, and a reinforcing core 11 of a hard synthetic resin or a metal wire is buried in the grooves 10.

Figure 5:
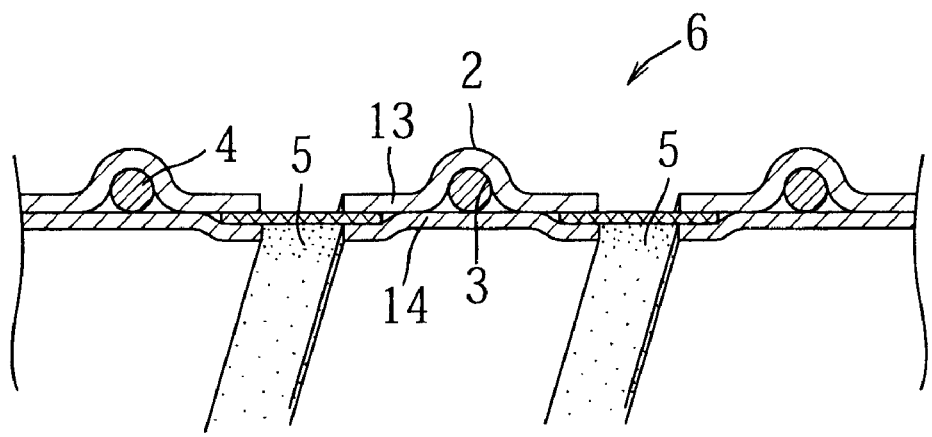
FIG. 5 is a sectional view of an essential portion of a second embodiment of the flexible hose of the invention.

FIG. 5 shows another embodiment of the flexible hose 6 of the invention. Soft synthetic resin tape 1 to be helically wound has a double structure including an outer tape 13 forming a hose outer circumference, and an inner tape 14 forming a hose inner circumference. End edge portions of air-permeable tape 5 are inserted between individual end edge portions of the outer tape 13 and inner tape 14, and outer and inner faces of the air-permeable tape 5, along with the outer tape 13 or the inner tape 14, are adhered or fused to each other and are helically wound together.

In this embodiment, the outer tape 13 is semi-circularly bulged at one widthwise position to form a ridge 2 on its outer face and a groove 3 in its inner face. In this groove 3, there is buried and fixed a reinforcing core 4 which is made of a hard resin. The outer tape 13 and the inner tape 14 are integrally adhered or fused to each other at two side portions on opposite sides of the reinforcing core 4.

In addition, the air-permeable tape 5 itself may have a double structure and is sandwiched between end edge portions of the resin tape 1. Moreover, an end edge portion of the resin tape 1 and an end edge portion of the air-permeable tape 5 are not overlaid but may be connected to each other through the reinforcing core 4.

Here, the structure for forming the aforementioned air-permeable portions may be further conceived, as follows. When the resin tape 1 is to be helically wound, at overlying portions between tape end edge portions leading and trailing in a longitudinal direction of the hose 6, there is sandwiched and adhered or fused a tape which extends through the overlying portions and has perforations in a widthwise direction for providing communication between an interior and an exterior of the hose. Between the overlying portions, alternatively, there is also sandwiched and adhered or fused a tape which has projections for forming a clearance in one direction. Alternatively, it is conceivable to form widthwise grooves, in advance, in the resin tape 1 itself and to adhere or fuse end edge portions of the tape so that air passages may be formed through the grooves.

Figure 6:
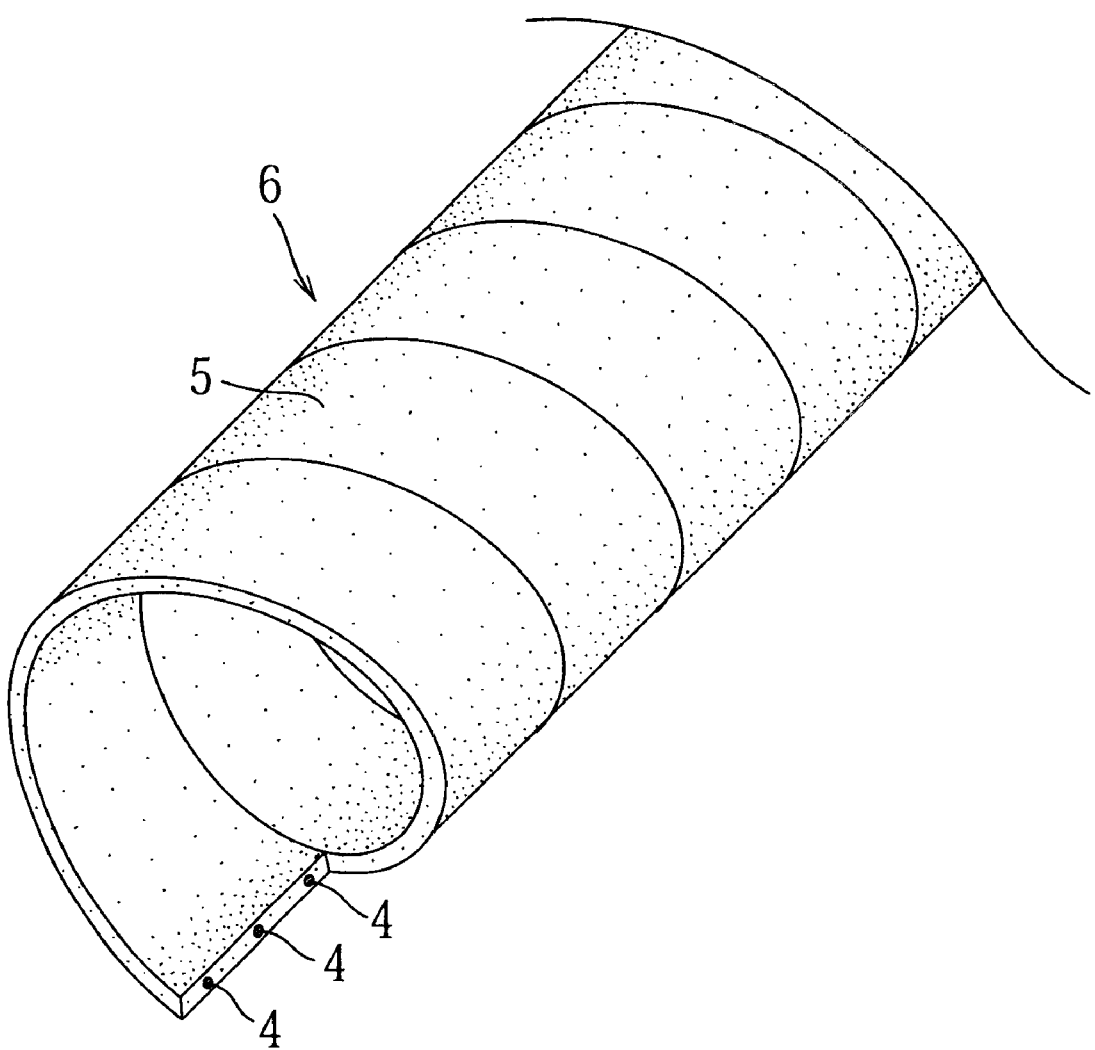
FIG. 6 is a perspective view showing a method of winding a flexible hose which is made exclusively of an air-permeable tape.

FIG. 6 shows flexible hose 6 which is made only of air-permeable tape 5 by using no resin tape. This flexible hose 6 is formed by winding the air-permeable tape 5 helically and by adhering or fusing confronting end edge portions of the tape leading and trailing in a longitudinal direction of the tape. In the air-permeable tape 5 at three widthwise positions, there are buried reinforcing cores 4, 4 and 4, which are made of a hard synthetic resin or a metal wire and extended in the longitudinal direction of the tape.

Figure 7:
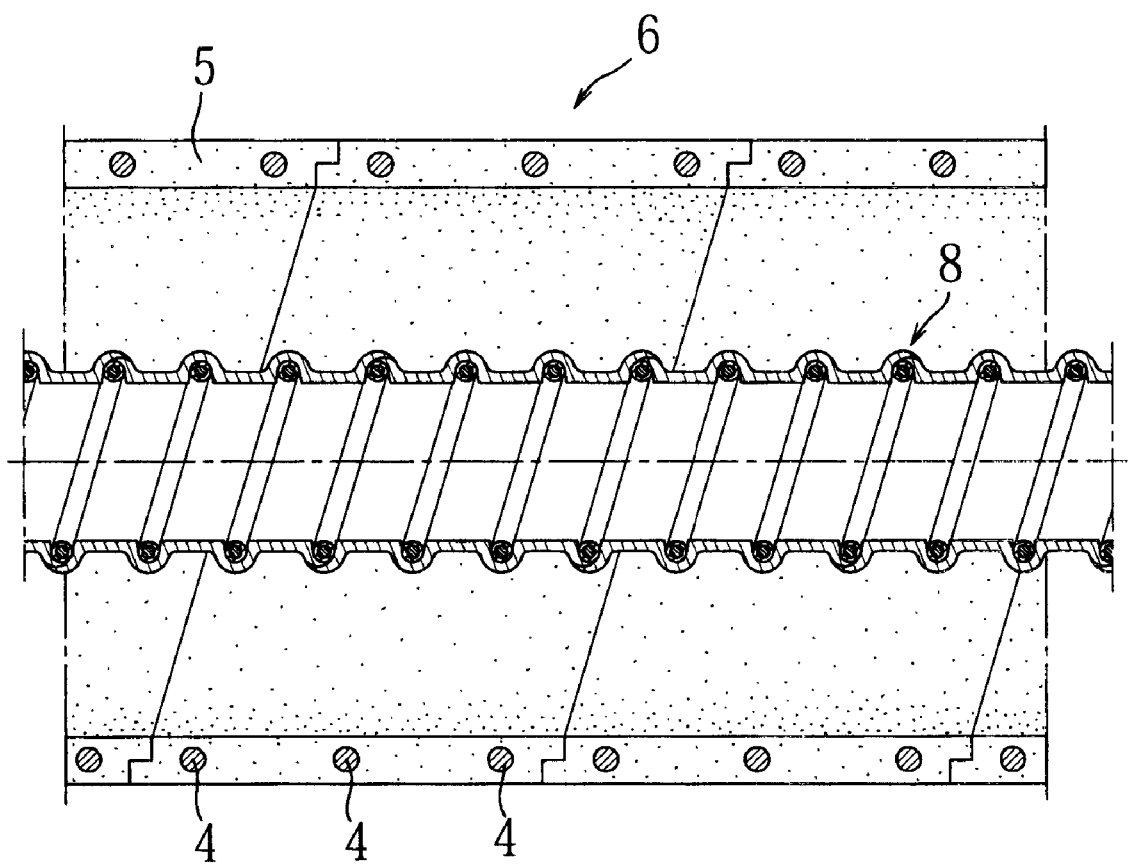
FIG. 7 is a sectional view showing an example of use of the flexible hose shown in FIG. 6.

FIG. 7 shows one specific example of using the flexible hose 6 shown in FIG. 6. As with the structure shown in FIG. 4, the flexible hose 6 is used as an outer tube of a double-tube structure, in which inner tube 8 is arranged. As a result, this structure can be used in an application similar to that of the structure shown in FIG. 4.

The embodiments thus far described have been described as a general flexible hose, though not especially limited to a cleaner hose, but can naturally be properly used as a cleaner hose.

Here will be described embodiments of the flexible hose, which can be most properly used as a cleaner hose.

Figure 8:
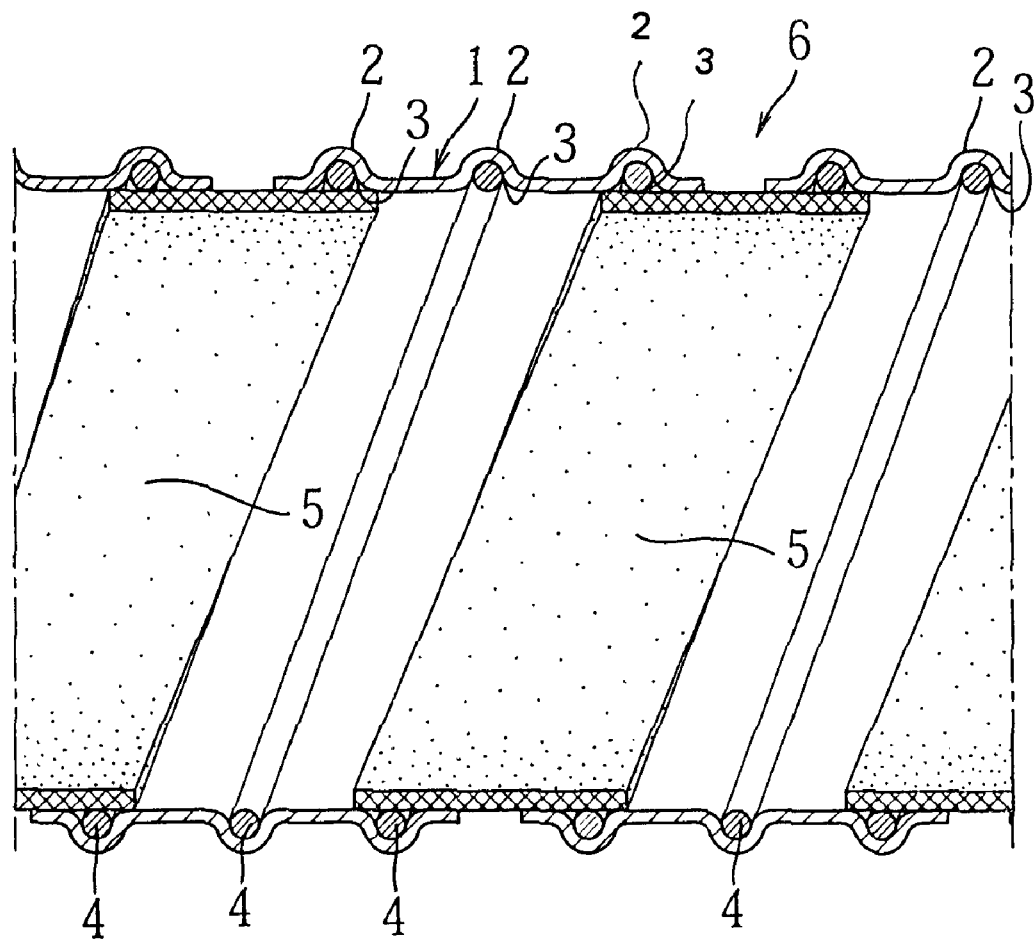
FIG. 8 is a sectional view of a flexible hose of the invention to be used as a cleaner hose.
Figure 9:
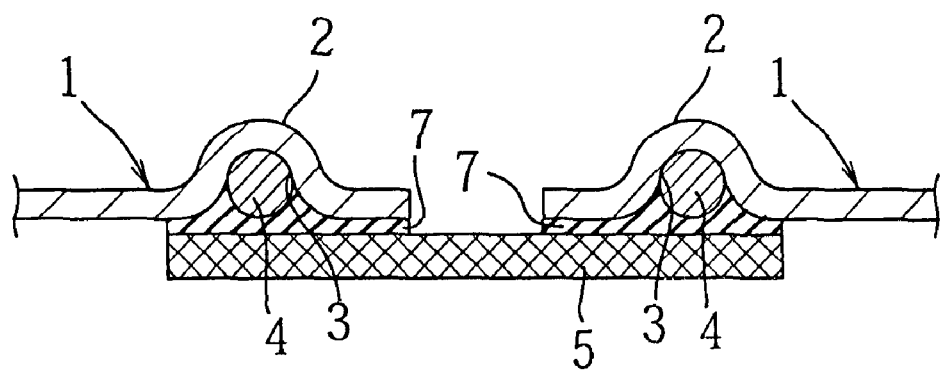
FIG. 9 is an enlarged sectional view of an essential portion of FIG. 8.
Figure 10:
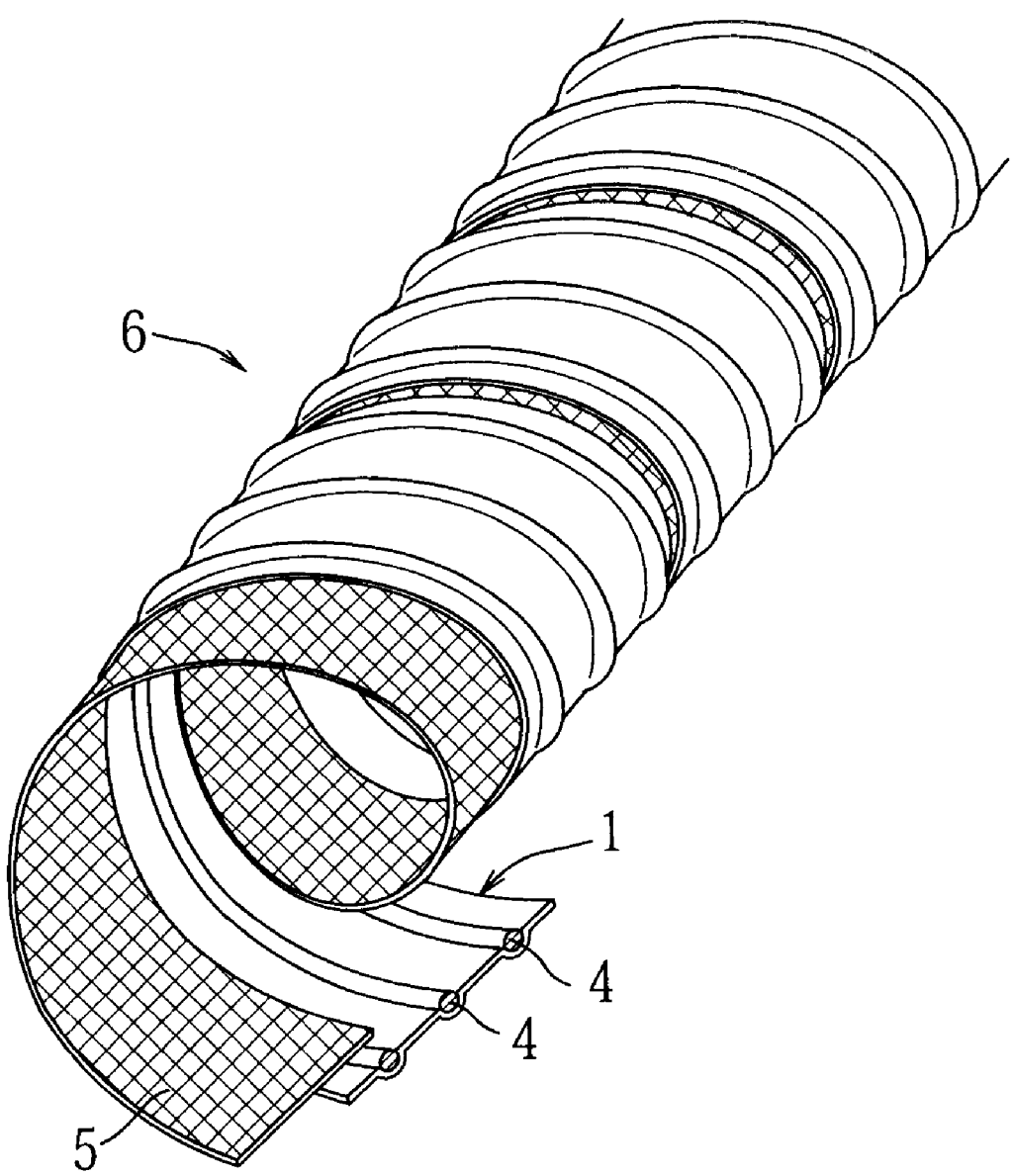
FIG. 10 is a perspective view showing a method of winding the flexible hose as shown in FIG. 8.

In the embodiment shown in FIGS. 8 to 10, soft resin tape 1 is also made, like before, of a non-vinyl chloride resin such as a polyolefin resin or polystyrene resin, or a vinyl chloride resin. The resin tape 1 is semi-circularly bulged at three positions spaced in a widthwise direction of the tape, to form three ridges 2, 2 and 2 extending in a tape longitudinal direction on an outer side portion for a hose outer circumference, and three grooves 3, 3 and 3 also in the tape longitudinal direction in an inner side portion for a hose inner circumference.

In these grooves 3, 3 and 3, like before, there are buried and fixed linear reinforcing cores 4, 4 and 4 to give the tape 1 proper flexibility and strength. These reinforcing cores 4, 4 and 4 are made of a hard resin such as polypropylene or a metal wire. Here, the reinforcing cores 4, 4 and 4 may be one or two, or four or more in number, but may not be used if strength is insufficient.

Air-permeable tape 5 of this embodiment is made of nonwoven or woven fabric, but may be made of another material if this material has an air-permeability and proper flexibility.

Moreover, the resin tape 1 and the air-permeable tape 5 are so helically wound together that end edge portions of the resin tape 1 leading and trailing in the hose longitudinal direction are spaced, and these spaces are filled by the air-permeable tape 5.

In this case, too, like the foregoing embodiments, one end edge of the air-permeable tape 5 is so laid over an inner side of one end edge of the resin tape 1 as to cover the reinforcing cores 4 located at one end edge side of the resin tape, and over another end edge of the air-permeable tape, so as to confront the former end edge of the air-permeable tape, is so laid over an inner side of the another end edge of the resin tape 1 as to cover the reinforcing cores 4 located at another end edge side of the resin tape. Moreover, the air-permeable tape 5 and the resin tape 1, and the reinforcing cores 4, are integrated with one another either by adhering them with an adhesive layer 7 or by fusing them. The air-permeable tape 5 may be adhered or fused at its end edge portions to outer sides of the resin tape 1, as has been described hereinbefore.

The flexible hose 6 to be used as a cleaner hose has such an air-permeability as to suck/discharge air through the air-permeable tape 5 at a flow velocity unlimitedly approaching zero. In view of the flexible hose 6 in its entirety, the resin tape 1 having a high strength has a shape keeping property such that the resin tape can exhibit an excellent shape keeping property and strength, even when the flexible hose is used as a repeatedly bent cleaner hose.

In this case, a ratio, as taken in the hose longitudinal direction, of an air-permeable portion provided by the air-permeable tape 5 to an air-impermeable portion provided by the resin tape 1 is 1:20 to 50. Thus, a stronger portion corresponding to the resin tape 1 is provided such that the flexible hose in its entirety can have a high strength.

Figure 11:
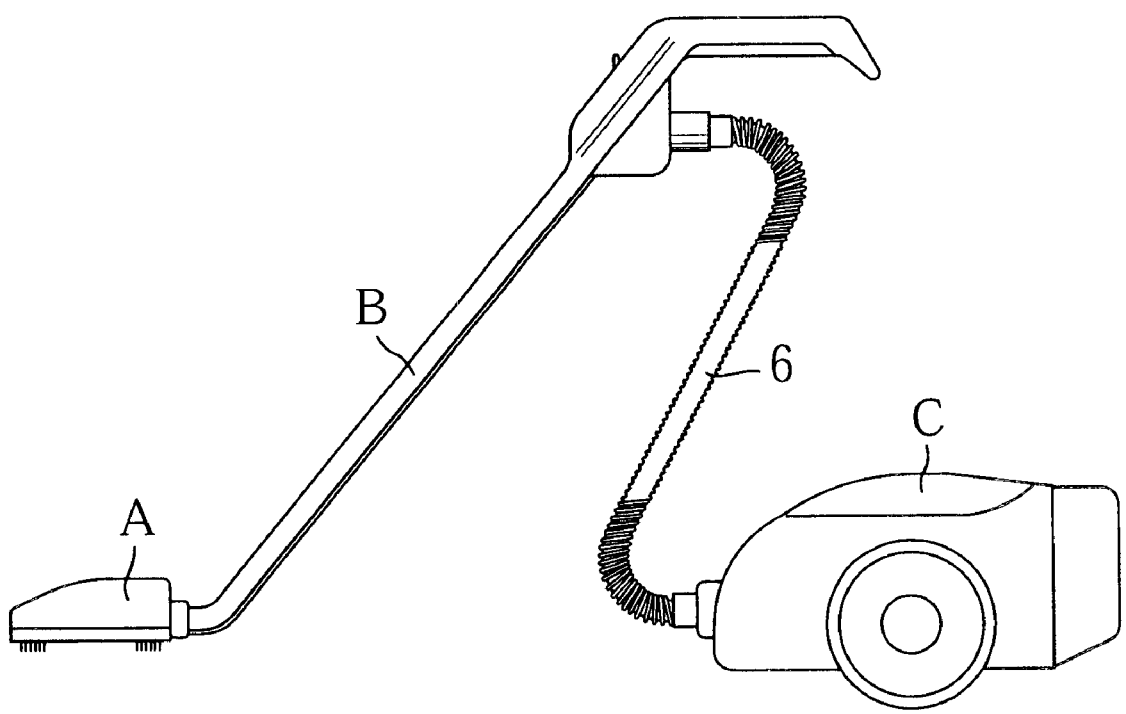
FIG. 11 is a side elevational view of a vacuum cleaner using a cleaner hose of the invention.

FIG. 11 shows a vacuum cleaner using the flexible hose 6 thus far described. To a suction nozzle A, there is connected an inflexible control pipe B which is made of a hard resin. The flexible hose 6 is used as an outer tube for a portion interconnecting the control pipe B and a vacuum cleaner body C.

Figure 12:
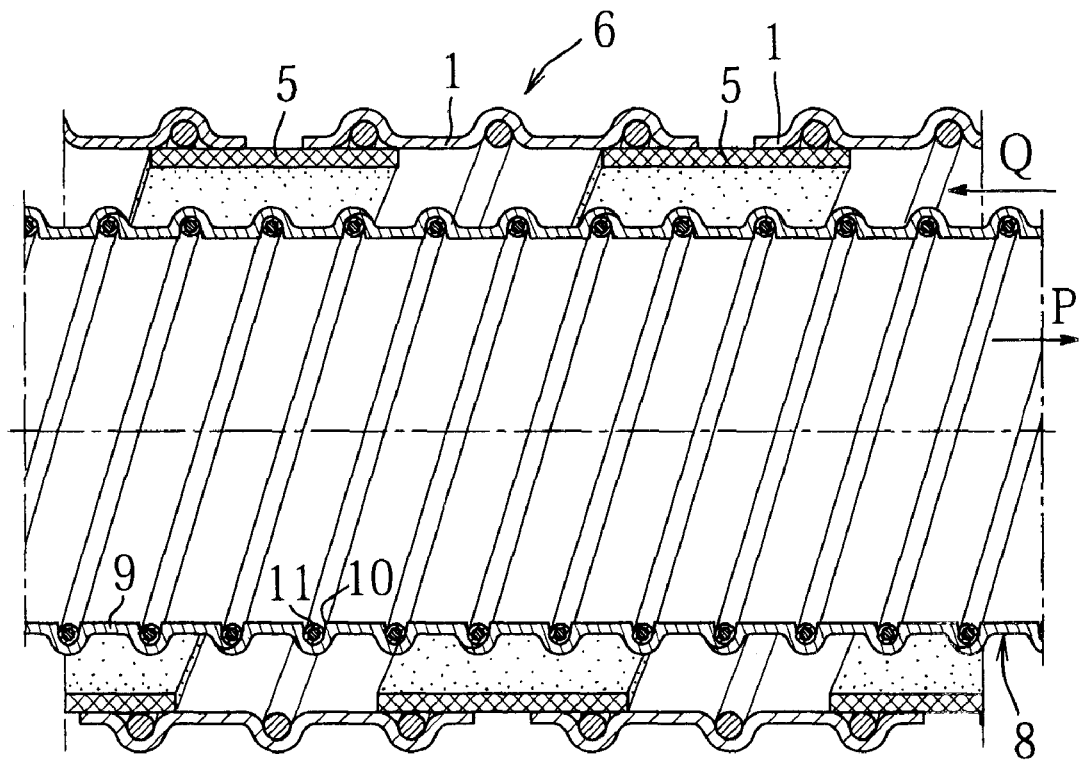
FIG. 12 is a sectional view of an essential portion, as longitudinally taken from a cleaner hose portion, of the vacuum cleaner of FIG. 11.

FIG. 12 shows a portion of the flexible hose 6 in a longitudinal section. In inner tube 8, to be disposed in the flexible hose 6, there flows in the direction of arrow P, as shown, from a side of the suction nozzle A, air containing sucked dust, so that the air and dust are sucked into the vacuum cleaner body C. The inner tube 8 is diametrically enlarged, as different from the embodiment of FIG. 7, to reduce space between the inner tube 8 and the flexible hose 6.

In the vacuum cleaner body C, the sucked dust is separated to reside in the body C by a filter (not shown) so that within the vacuum cleaner body air having passed through the filter flows into the space between the flexible hose 6 and the inner tube 8 so that this air flows in the direction of arrow Q of FIG. 12 within the space until the air is circulated to a side of the nozzle A. During flow of air through the space between the flexible hose 6 and the inner tube 8, moreover, the air is partially released from the air-permeable tape 5 to an exterior of the flexible hose.

Here in FIG. 12, the inner tube 8 is also made of a flexible hose by helically winding soft resin tape 9, similar to the resin tape 1, and by adhering or fusing together confronting tape end edge portions leading and trailing in a longitudinal direction of the flexible hose. The tape 9 for forming the inner tube 8 is also semi-circularly bulged at a plurality of widthwise positions to form grooves 10 in its inner circumference, and reinforcing cores 11 made of hard synthetic resin or metal wire are buried in the grooves 10.

Figure 13:
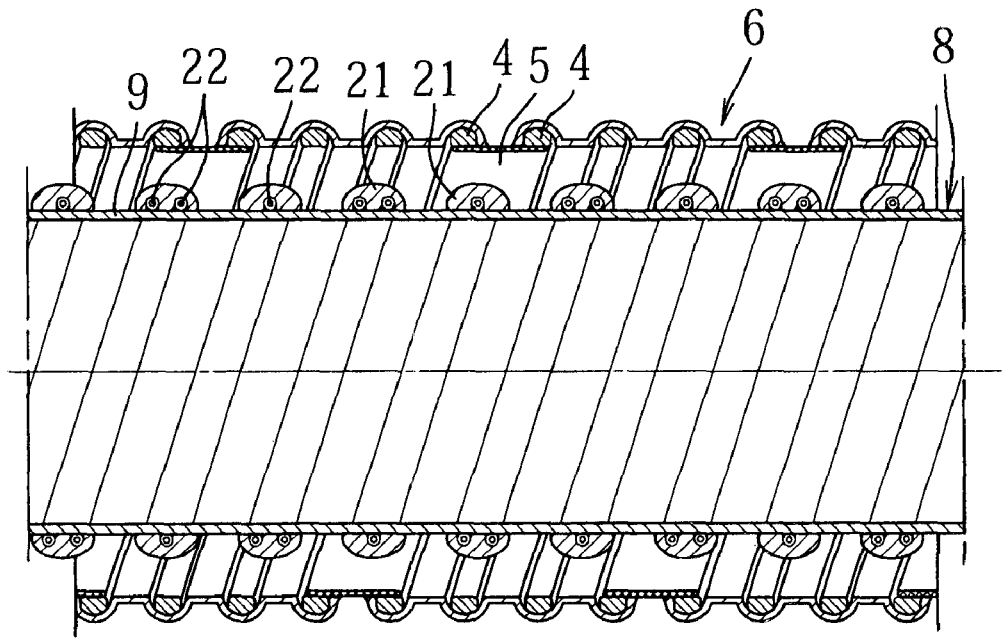
FIG. 13 is a sectional view of a cleaner hose and shows another embodiment of the invention.

FIG. 13 and subsequent Figures show another embodiment, in which air-permeable tape 5 is sandwiched between resin tapes 1 to provide a flexible hose 6 to be used as an outer tube of a cleaner hose.

In the embodiments up to FIG. 12, air-permeable tape 5 is made by arranging a non-woven or woven fabric single member between resin tapes 1. According to this structure, tensile strength may be reduced in a case of a cleaner hose being repeatedly bent many times. In the embodiment of FIG. 13 and the subsequent Figures, therefore, air-permeable tape 5 has a two-layered structure of a non-woven fabric 16 and a woven fabric 17, as shown in FIG. 14.

Figure 16:
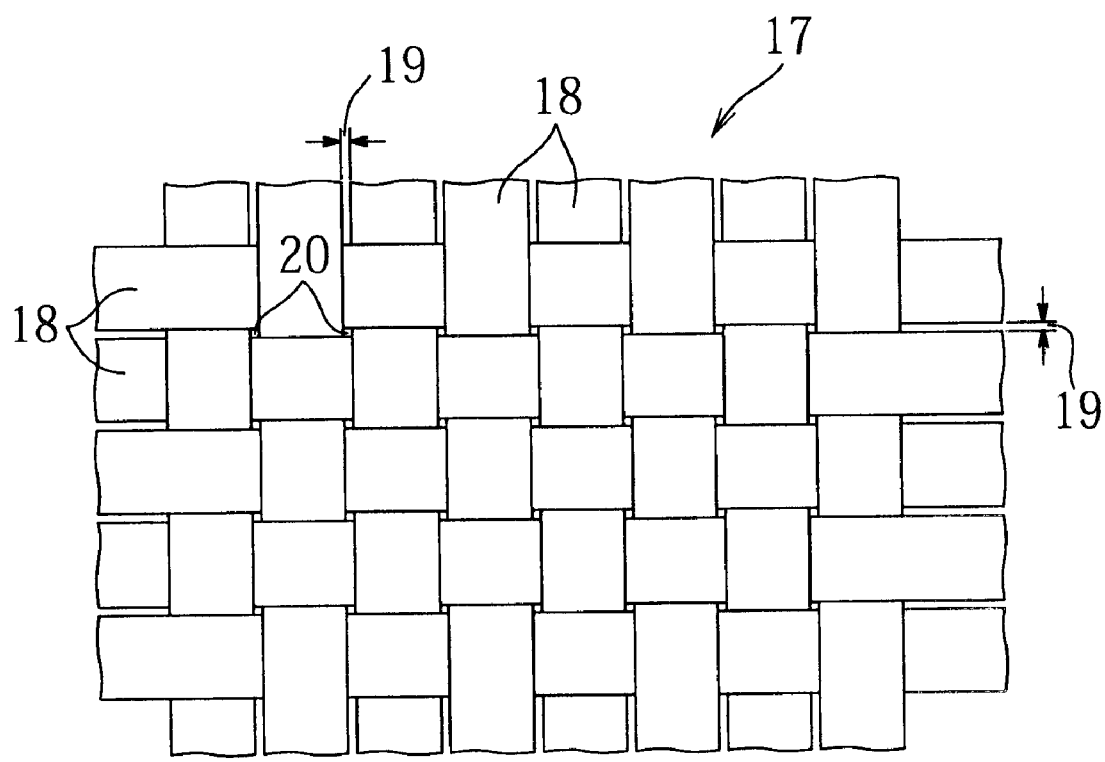
FIG. 16 is an enlarged top plan view of an essential portion of a woven fabric to be used in the air-permeable tape of FIG. 15.

As shown in FIG. 16, the woven fabric 17 is woven crosswise from a number of woven tapes 18, 18. These woven tapes 18 are prepared by orienting a polypropylene resin to augment tensile strength, and subsequently by slitting the resin to a predetermined width.

The woven tapes 18 have a width of 0.85 mm and a thickness of 0.03 mm, for example, and are woven width small clearances 19 between adjacent tapes to form air-permeable holes 20 at corners which are defined by four crosswise adjoining woven tapes 18. Moreover, the woven fabric 17 and the non-woven fabric 16 are integrally laminated in advance, for example, by overlaying and fusing them to each other.

Figure 14:
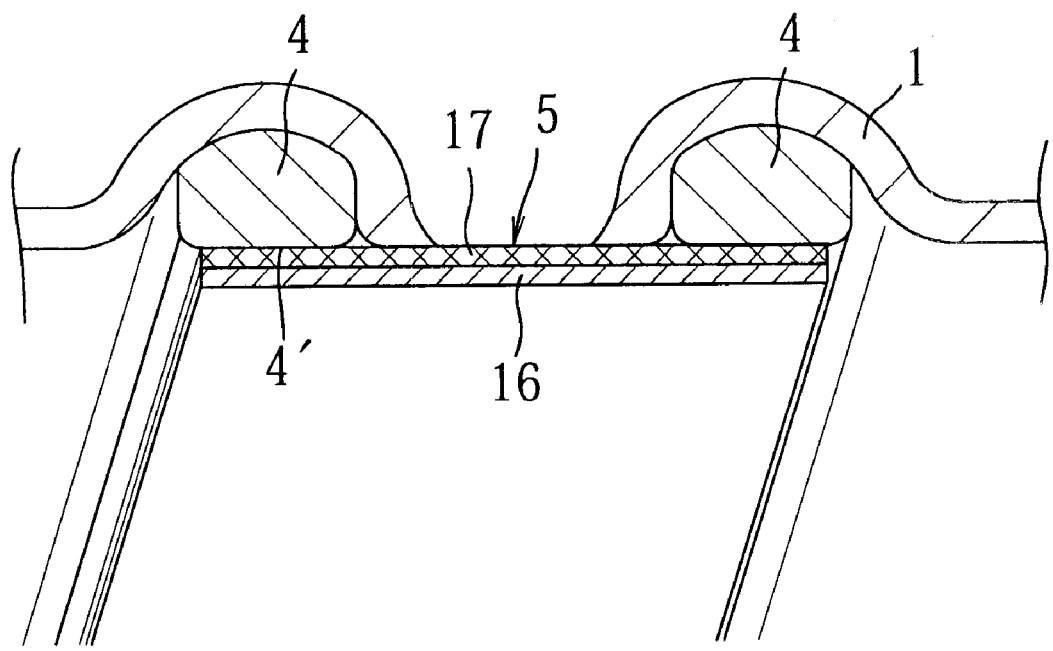
FIG. 14 is an enlarged sectional view of an essential portion of the cleaner hose of FIG. 13.
Figure 15:
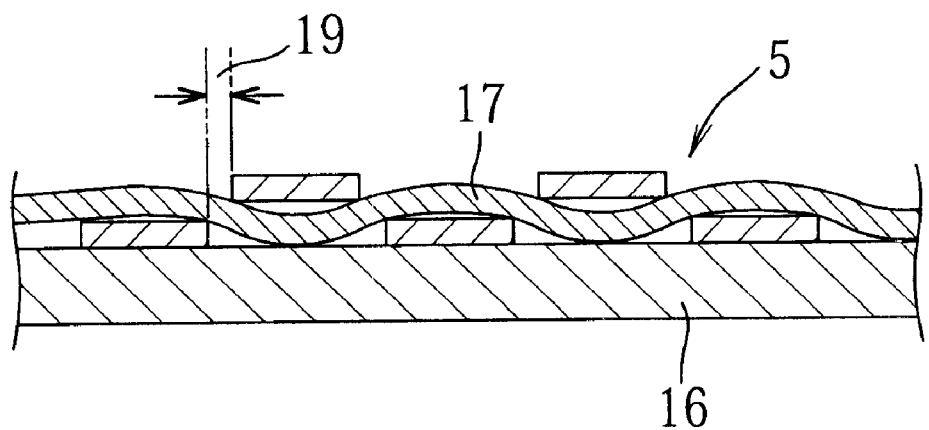
FIG. 15 is an enlarged sectional view of an essential portion of an air-permeable tape.

The air-permeable tape 5 thus having the two-layered structure of the woven fabric 17 and the non-woven fabric 16 is made, as shown in FIG. 14, by winding the woven fabric 17 helically on a side of the resin tape 1, i.e., on an outer side in this embodiment such that its end edges are laid over an inner side of the resin tape 1, especially over reinforcing core 4 exposed from an inner face of the resin tape 1, and by fusing the reinforcing core 4 and the air-permeable tape 5. In this case, the reinforcing core 4 has a generally elliptical or circular section and a flat portion 4' at a portion exposed to an inner circumference of the flexible hose, and is fused at the flat portion 4'.

When the air-permeable tape 5 and the reinforcing core 4 are to be fused, it is desired to select materials having excellent mutual fusibility. Where polypropylene resin is used as the material for the woven fabric 17, or a fused face of the air-permeable tape 5, for example, it is desirable that the same polypropylene resin is used as the material for the reinforcing core 4. It is, however, not excluded that the woven fabric 17 and the resin tape 1 can be connected by virtue of an adhesive.

The flexible hose 6 of this embodiment is highly strong because the air-permeable tape 5 has a two-layered structure. The air-permeable tape 5 is hardly broken even if it is tensed while bending the hose 6, especially because the woven fabric 17, of a highly strong resin, and the resin tape 1 are integrally connected. Also, the air-permeable tape 5 is fused to the reinforcing core 4 having a high heat capacity so that a high fusion strength can be obtained.

Since the inner non-woven fabric 16 has very fine pores of air-permeable portions, as compared with the woven fabric 17, the non-woven fabric can be expected to play not only a role of a filter for preventing dust passing through the flexible hose from being entrained to an exterior of the flexible hose, but also a role of a sound absorbing material.

In FIG. 13, the inner tube 8 is inserted into the flexible hose 6. This inner tube 8 is also constructed by helically winding resin tape 9 like before. On an outer circumference of the resin tape 9, there are helically wound two reinforcing cores 21 and 21 which are made of a hard resin. In these reinforcing cores 21, there are sheathed one or two conductors 22 and 22 for transmitting electric power and electric signals to suction nozzle A.

In hoses of the double-tube structure of FIGS. 4, 7, 8, 12 and 13, when the hose 6, acting as the outer tube, and the inner tube 8 are bent, as between an inner circumference of the flexible hose 6 and an outer circumference of the inner tube 8, the inner circumference of the flexible hose 6 is rubbed in this embodiment by surfaces of projections, such as the reinforcing cores 21, on an outer side of the inner tube 8, so that the projections or reinforcing cores 21 are possibly worn after a long use such that the conductors 22 are exposed, or so that the flexible hose 6 is possibly worn to the point of holes being formed therein.

Therefore, a lubricant is applied to or mixed into a surface of the projections, such as the reinforcing cores 21, and/or the inner circumference of the flexible hose 6 that rubs against the projections, thereby to provide lubricating properties. More specifically, it is conceivable to mix lubricant in advance when preparing the resin tape 1 for forming flexible hose 6, and to helically wind the resin tape 1 together with the air-permeable tape 5.

This application or mixing of the lubricant need not always be performed over all portions of the flexible hose, and can be omitted from portions which have no or little chance of being worn by rubbing. In the case of application of lubricant to the inner tube 8, it is desirable to apply the lubricant to projections, such as the reinforcing cores 21. In the absence of projections, or reinforcing cores 21, however, application of the lubricant is made to a portion constituting a body of the inner tube.

The lubricant to be Used should not be especially limited if it acts as an external lubricant for lubricating surfaces, but can be exemplified by a variety of lubricants such as silicones, fluorine-containing resins, fatty acids, paraffins or waxes. Suitable weight parts of lubricants are mixed according to desired characteristics of the lubricants.

Here, any of the flexible hoses 6 of the foregoing embodiments has the air-permeable tape 5 in combination with the resin tape 1. Where air permeability is not needed; that is, where air to be circulated to the suction nozzle A as shown FIG. 11 need not be partially released from the flexible hose 6, an air-permeable tape 5 is not used. It is quite natural that such activity can be applied to such a case.

Although the invention has been described in connection with its preferred embodiments, it should not be limited thereto but can be modified in various manners, as inclusive, within the scope of the appended claims.

What is claimed is:

1. A flexible hose structure comprising:

a flexible hose including an air-permeable tape integral with, and helically wound with, a soft resin tape such that provided along a longitudinal direction of said flexible hose are alternating sections of said air-permeable tape and said soft resin tape; and at least one reinforcing member positioned between side edges of said soft resin tape such that along the longitudinal direction of said flexible hose is provided a reinforcing core consisting of said at least one reinforcing member, wherein said air-permeable tape fluidly interconnects an exterior of said flexible hose with an interior of said flexible hose such that air can flow through said air-permeable tape from the exterior of said flexible hose to the interior of said flexible hose or from the interior of said flexible hose to the exterior of said flexible hose.

2. The flexible hose structure according to claim 1, wherein the flexible hose structure is to be used as a cleaner hose.

3. The flexible hose structure according to claim 1, wherein said sections of said air-permeable tape define air-permeable portions and said sections of soft resin tape define air-impermeable portions, such that a ratio of said air-permeable portions to said air-impermeable portions, along the longitudinal direction of said flexible hose, is from 1:20 to 1:50.

4. The flexible hose structure according to claim 3, wherein the flexible hose structure is to be used as a cleaner hose.

5. The flexible hose structure according to claim 1, wherein said soft resin tape comprises an outer tape and an inner tape such that said alternating sections of said air-permeable tape and said soft resin tape are defined by edges of said air-permeable tape that are sandwiched between, and adhered to or fused with, corresponding edges of said outer tape and said inner tape, with said outer tape defining a circumference of said flexible hose.

6. The flexible hose structure according to claim 5, wherein the flexible hose structure is to be used as a cleaner hose.

7. The flexible hose structure according to claim 1, further comprising:

a flexible tube positioned within said flexible hose such that a gas communication passage is defined between said flexible hose and said flexible tube.

8. The flexible hose structure according to claim 7, wherein the flexible hose structure is to be used as a cleaner hose.

9. The flexible hose structure according to claim 1, wherein said air-permeable tape comprises a woven fabric or a non-woven fabric such that provided along the longitudinal direction of said flexible hose are alternating sections of said woven fabric or non-woven fabric and said soft resin tape.

10. The flexible hose structure according to claim 9, wherein the flexible hose structure is to be used as a cleaner hose.

11. A flexible hose structure comprising:

a flexible hose including an air-permeable tape integral with, and helically wound with, a soft resin tape such that provided along a longitudinal direction of said flexible hose are alternating sections of said air-permeable tape and said soft resin tape; and at least one reinforcing member positioned between side edges of said soft resin tape such that along the longitudinal direction of said flexible hose is provided a reinforcing core consisting of said at least one reinforcing member, wherein said reinforcing core is fused with or adhered to said sections of said air-permeable tape, and wherein said air-permeable tape fluidly interconnects an exterior of said flexible hose with an interior of said flexible hose such that air can flow through said air-permeable tape from the exterior of said flexible hose to the interior of said flexible hose or from the interior of said flexible hose to the exterior of said flexible hose.

12. The flexible hose structure according to claim 11, wherein the flexible hose structure is to be used as a cleaner hose.

13. The flexible hose structure according to claim 11, wherein said alternating sections of said air-permeable tape and said soft resin tape are defined by edges of said air-permeable tape that are positioned over, and adhered to or fused with, corresponding edges of said soft resin tape.

14. The flexible hose structure according to claim 13, wherein the flexible hose structure is to be used as a cleaner hose.

* * * * *